United States Patent
Mall

(10) Patent No.: US 11,567,742 B2
(45) Date of Patent: Jan. 31, 2023

(54) METHOD, APPARATUS, AND COMPUTER PROGRAM PRODUCT FOR GENERATING UPDATED NETWORK APPLICATION INTERFACES

(71) Applicant: ATLASSIAN PTY LTD, Sydney (AU)

(72) Inventor: Orpheus Mall, San Francisco, CA (US)

(73) Assignee: ATLASSIAN PTY LTD., Sydney (AU)

(*) Notice: Subject to any disclaimer, the term of this patent is extended or adjusted under 35 U.S.C. 154(b) by 133 days.

(21) Appl. No.: 15/859,129

(22) Filed: Dec. 29, 2017

(65) Prior Publication Data

US 2018/0189037 A1    Jul. 5, 2018

Related U.S. Application Data

(60) Provisional application No. 62/440,202, filed on Dec. 29, 2016.

(51) Int. Cl.
*G06F 8/38* (2018.01)
*G06F 8/658* (2018.01)
(Continued)

(52) U.S. Cl.
CPC ............ *G06F 8/38* (2013.01); *G06F 8/65* (2013.01); *G06F 8/658* (2018.02); *G06F 9/461* (2013.01); *H04L 67/14* (2013.01); *G06F 8/656* (2018.02)

(58) Field of Classification Search
CPC .............. G06F 9/54–548; G06F 3/048; G06F 9/44–4558; G06F 9/46–548; G06F 9/451; G06F 8/38; G06F 8/65–66; G06F 8/658; G06F 8/656; G06F 9/461–463; H04L 67/02–025; H04L 67/14
See application file for complete search history.

(56) References Cited

U.S. PATENT DOCUMENTS

| | | | | |
|---|---|---|---|---|
| 7,953,790 B2* | 5/2011 | Amano | ............... | H04L 67/02 709/227 |
| 2002/0095584 A1* | 7/2002 | Royer | ............... | G06F 21/41 713/183 |

(Continued)

OTHER PUBLICATIONS

Christensson, Per. "API Definition." TechTerms. Sharpened Productions, Jun. 20, 2016. Web. <https://techterms.com/definition/api>. (Year: 2016).*

*Primary Examiner* — Liang Y Li
(74) *Attorney, Agent, or Firm* — Brownstein Hyatt Farber Schreck, LLP

(57) ABSTRACT

Embodiments of the present invention provide methods, apparatuses, and computer program products for generating updated network application interfaces. A computer-implemented method may include outputting a first network application interface associated with a first network application; receiving a network application file generation request including a first network application session identifier; outputting a second network application interface based on the network application file generation request and the second network application protocol; receiving a network application return request including the first network application session identifier and a second network application session identifier; and outputting, an updated first network application interface based on the network application return request and the first network application protocol.

18 Claims, 9 Drawing Sheets

(51) Int. Cl.
*G06F 8/65* (2018.01)
*G06F 9/46* (2006.01)
*H04L 67/14* (2022.01)
*G06F 8/656* (2018.01)

(56) References Cited

U.S. PATENT DOCUMENTS

| | | | |
|---|---|---|---|
| 2005/0229188 A1* | 10/2005 | Schneider | H04L 67/02 719/328 |
| 2010/0017695 A1* | 1/2010 | Palmieri | G06F 16/95 715/205 |
| 2014/0019523 A1* | 1/2014 | Heymann | H04L 67/1027 709/203 |
| 2014/0195963 A1* | 7/2014 | Cheung | G06F 3/0482 715/781 |
| 2014/0229839 A1* | 8/2014 | Lynch | G06F 9/44505 715/736 |
| 2015/0271245 A1* | 9/2015 | Xu | G06F 16/84 709/203 |
| 2017/0336924 A1* | 11/2017 | Muchnick | G06F 9/44505 |
| 2018/0018345 A1* | 1/2018 | Jain | G06F 3/04817 |

* cited by examiner

METHOD, APPARATUS, AND COMPUTER PROGRAM PRODUCT FOR GENERATING UPDATED NETWORK APPLICATION INTERFACES

CROSS-REFERENCE TO RELATED APPLICATIONS

This application claims priority to U.S. Provisional Application No. 62/440,202, filed Dec. 29, 2016, which is hereby incorporated herein in its entirety by reference.

BACKGROUND

An enterprise platform may support several distinct network applications. The inventors have identified a number of deficiencies and problems associated with generating network application interfaces and navigating between such interfaces. Through applied effort, ingenuity, and innovation, many of these identified problems have been solved by developing solutions that are included in the embodiments of the present invention, many examples of which are described in detail herein.

BRIEF SUMMARY

In general, embodiments of the present invention provide methods, apparatuses, computer program products and/or the like for improving network application interface functionalities. More specifically, various embodiments are related to generating network application interfaces and navigating between such interfaces.

In accordance with one aspect, a computer-implemented method for improving network application interface functionalities between a first network application having a first network application protocol and a second network application having a second network application protocol is provided. In one embodiment, the method comprises outputting, to a client device, a first network application interface associated with the first network application; receiving, from the client device, a network application file generation request associated with the first network application interface, the network application file generation request comprising a first network application session identifier; outputting, to the client device, a second network application interface associated with the second network application based on the network application file generation request and the second network application protocol; receiving, from the client device, user inputs associated with the second network application interface; generating a second network application file accessible by the second network application based at least in part on the user inputs; receiving, from the client device, a network application return request associated with the second network application interface, the network application return request comprising the first network application session identifier and a second network application session identifier; and outputting, to the client device, an updated first network application interface associated with the first network application based on the network application return request and the first network application protocol.

Other embodiments include corresponding systems, apparatuses, and computer programs, configured to perform the method, encoded on computer storage devices. These and other embodiments can each optionally include where the first network application session identifier indicates first network application session data stored in a network database, and the second network application session identifier indicates second network application session data stored in the network application database.

Other embodiments can optionally include the first network application session data including at least one of a first user attribute, a first time attribute, or a first status attribute, and the second network application session data including at least one of a second user attribute, a second time attribute, or a second status attribute.

Other embodiments can optionally include retrieving, based on the first network application session identifier, the first network application session data; and generating, based on the first network application session data and the first network application protocol, the updated first network application interface.

Other embodiments can optionally include determining, based on the first network application session identifier, whether a first network application file is available; based on the first network application file not being available, outputting, to the client device, an unavailability notification; and based on the first network application file being available, linking the second network application file with the first network application file.

Other embodiments can optionally include where the first network application protocol is a first Application Program Interface (API), and the second network application protocol is a second API.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
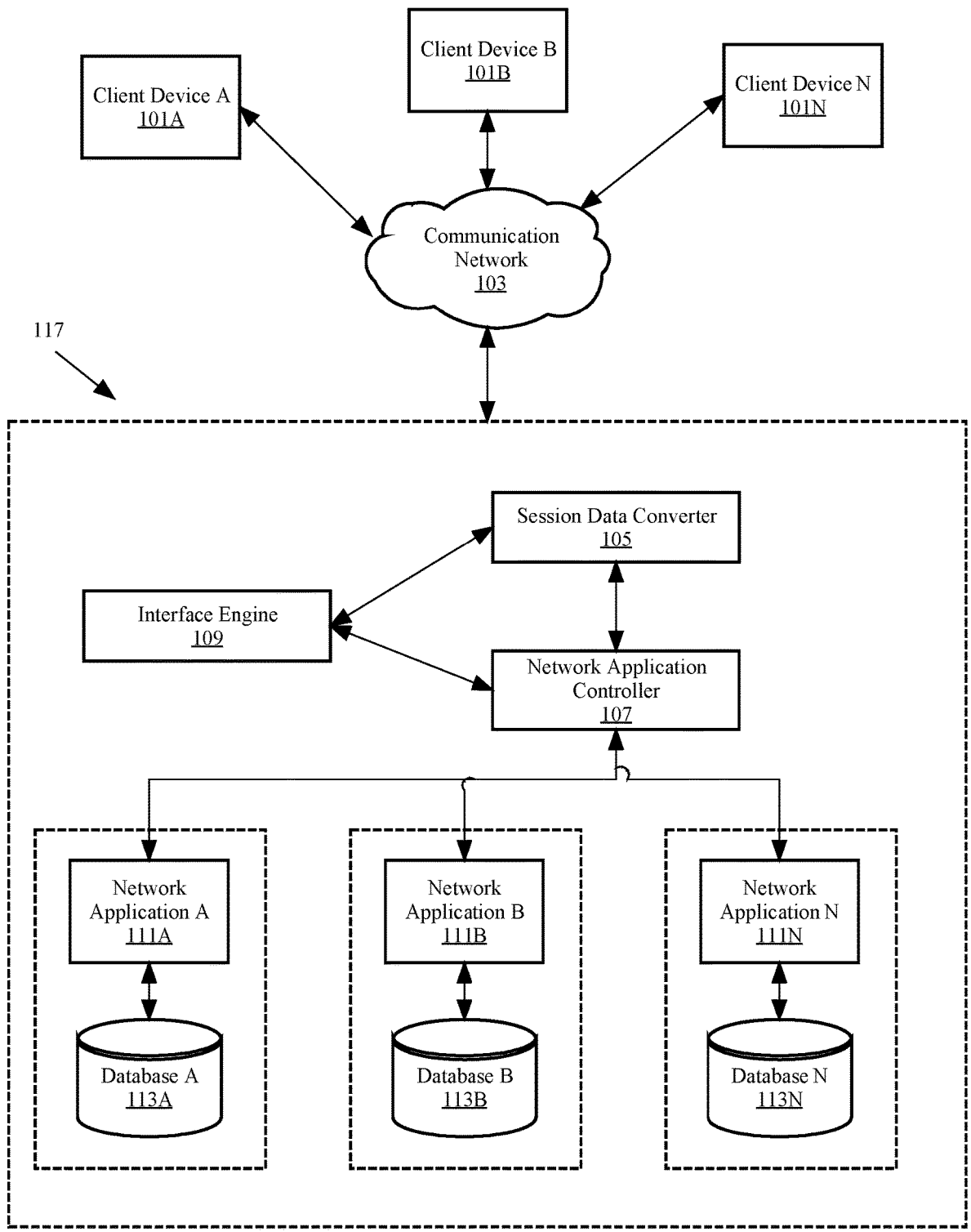
Figure 2:
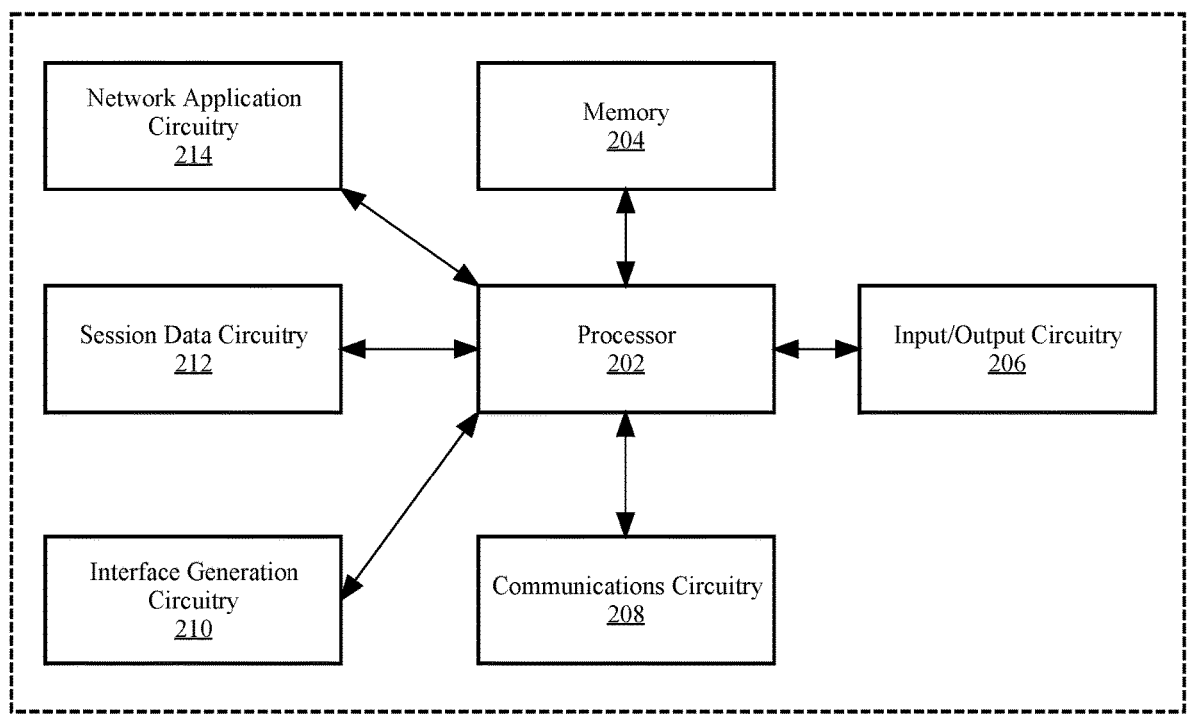
Figure 3A:
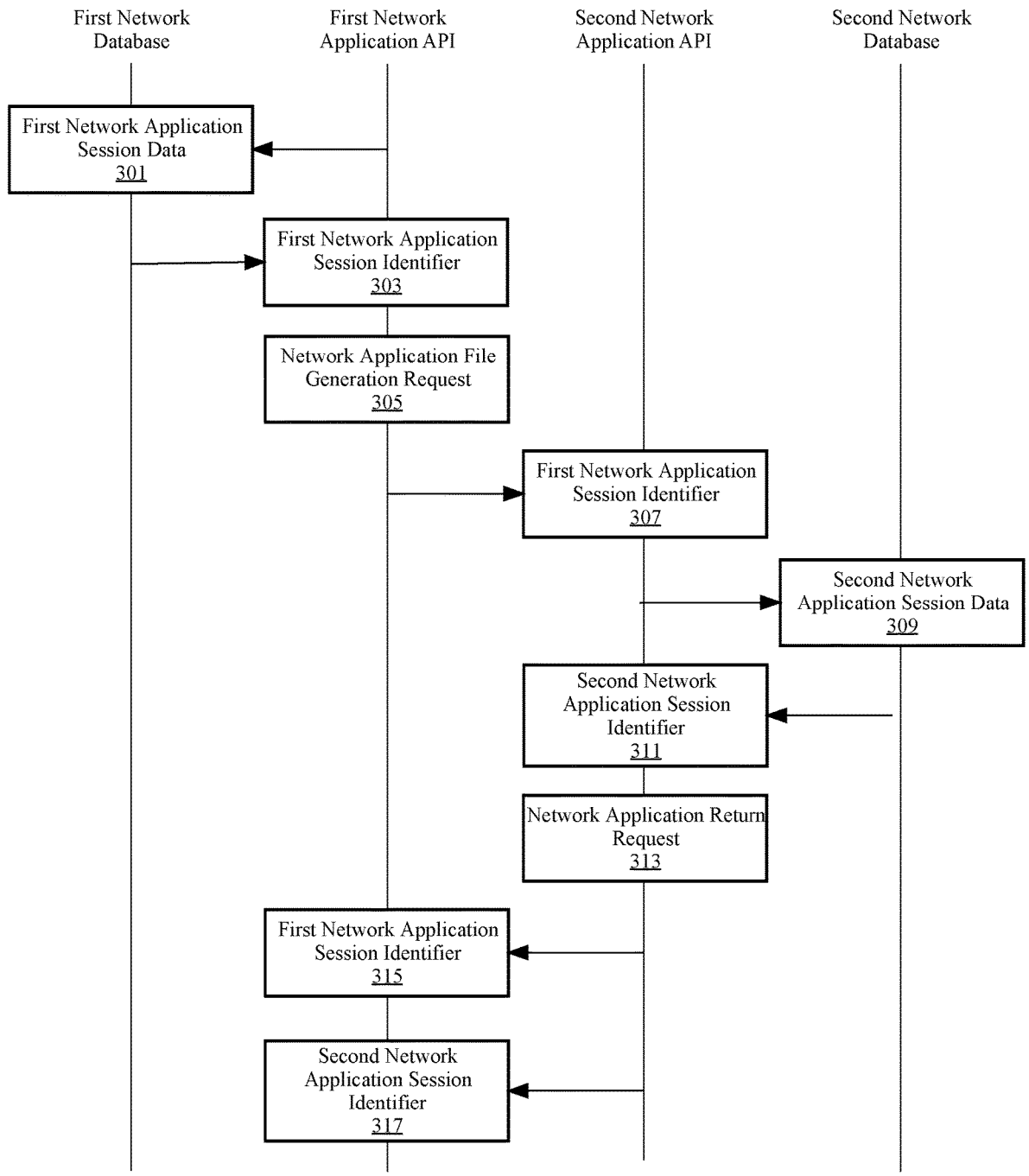
Figure 3B:
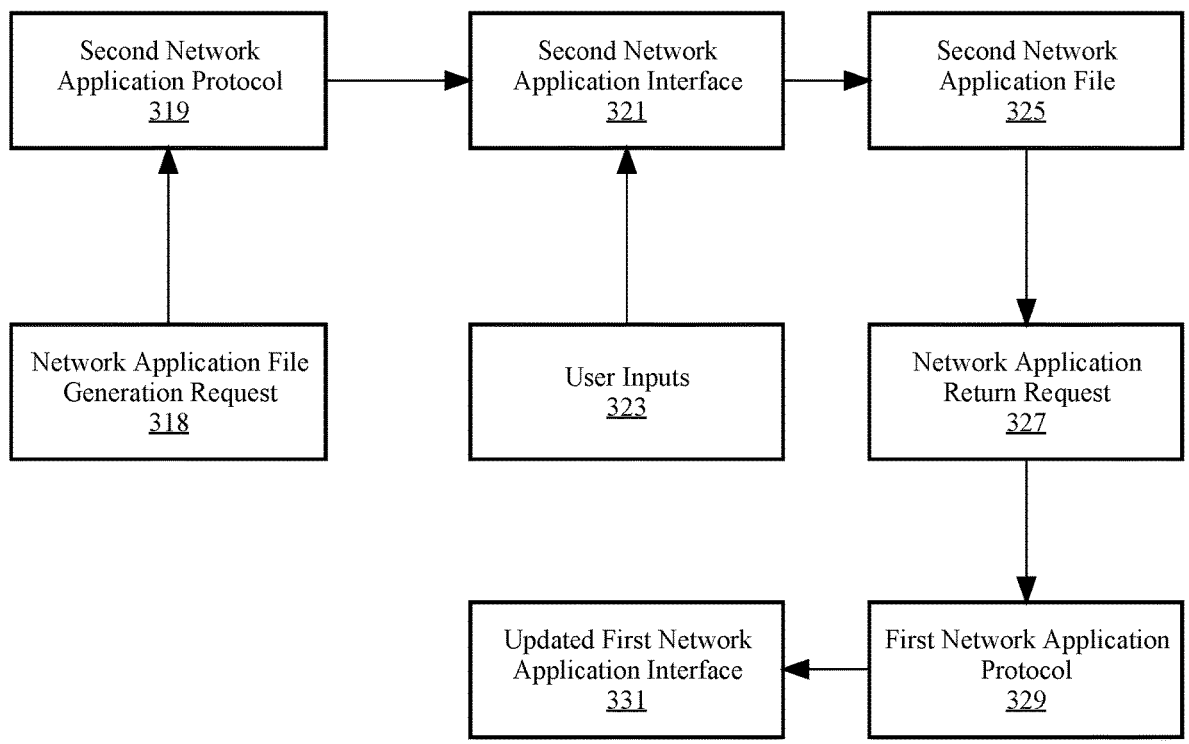
Figure 3C:
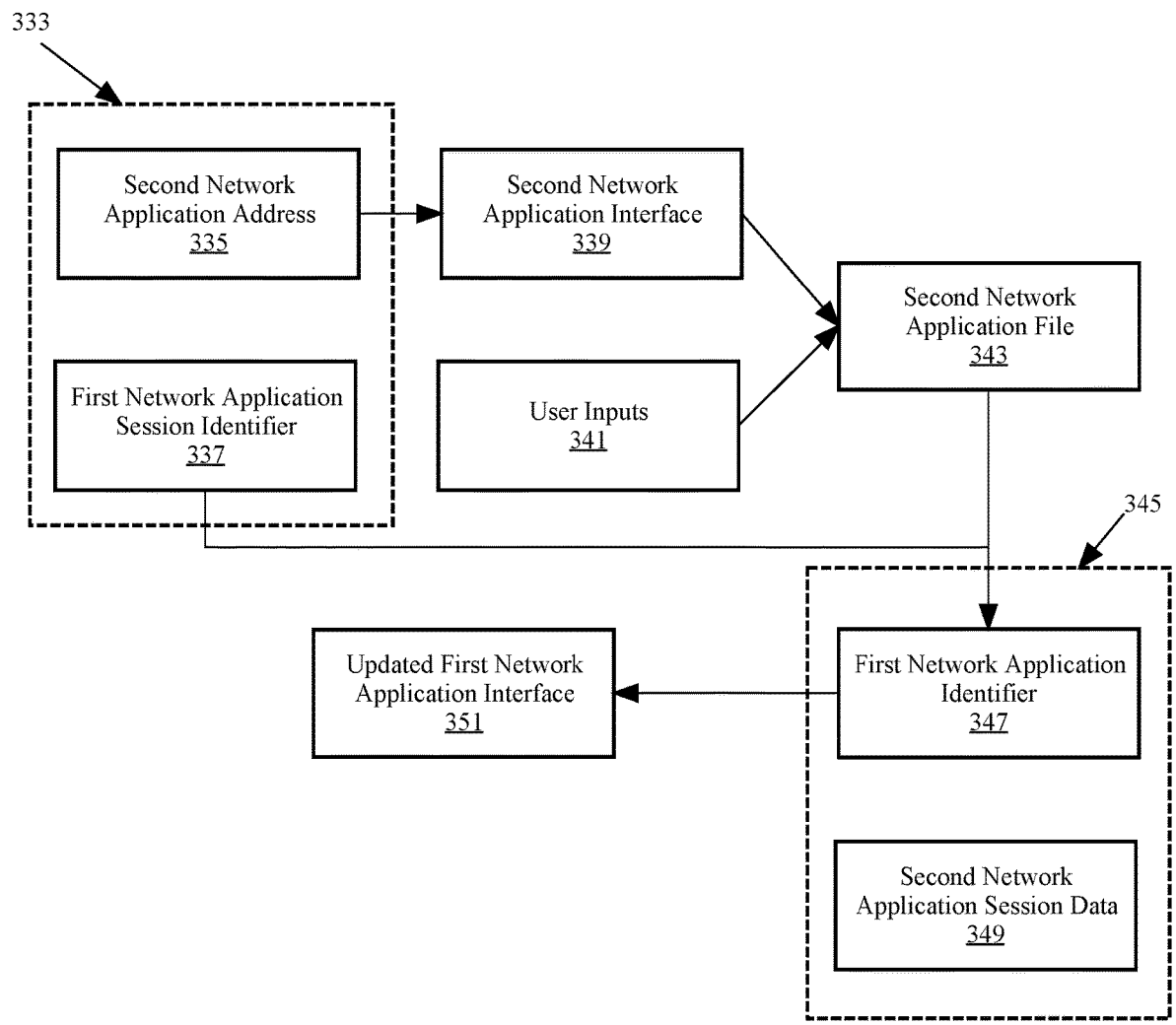
Figure 4:
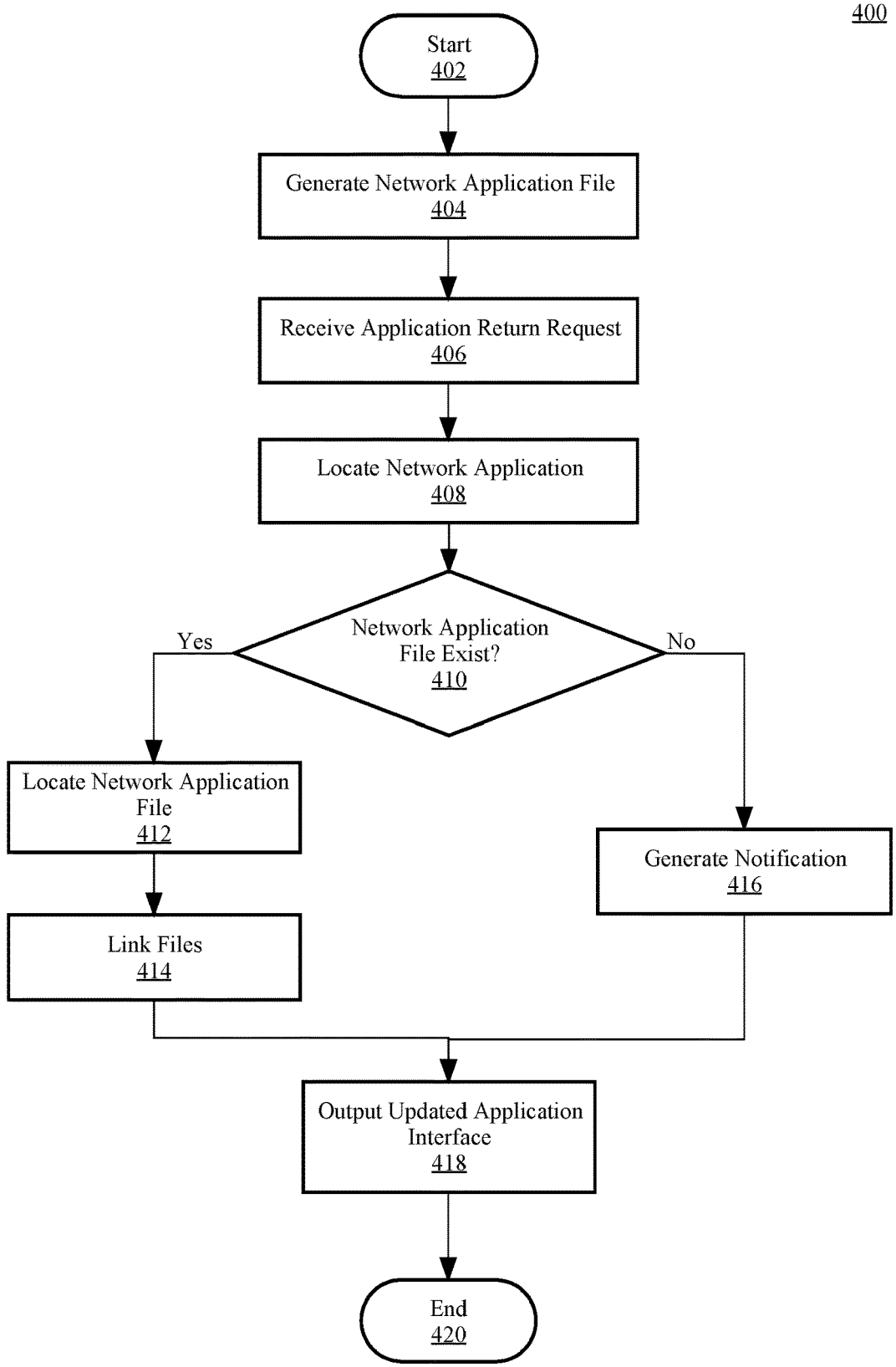
Figure 5A:
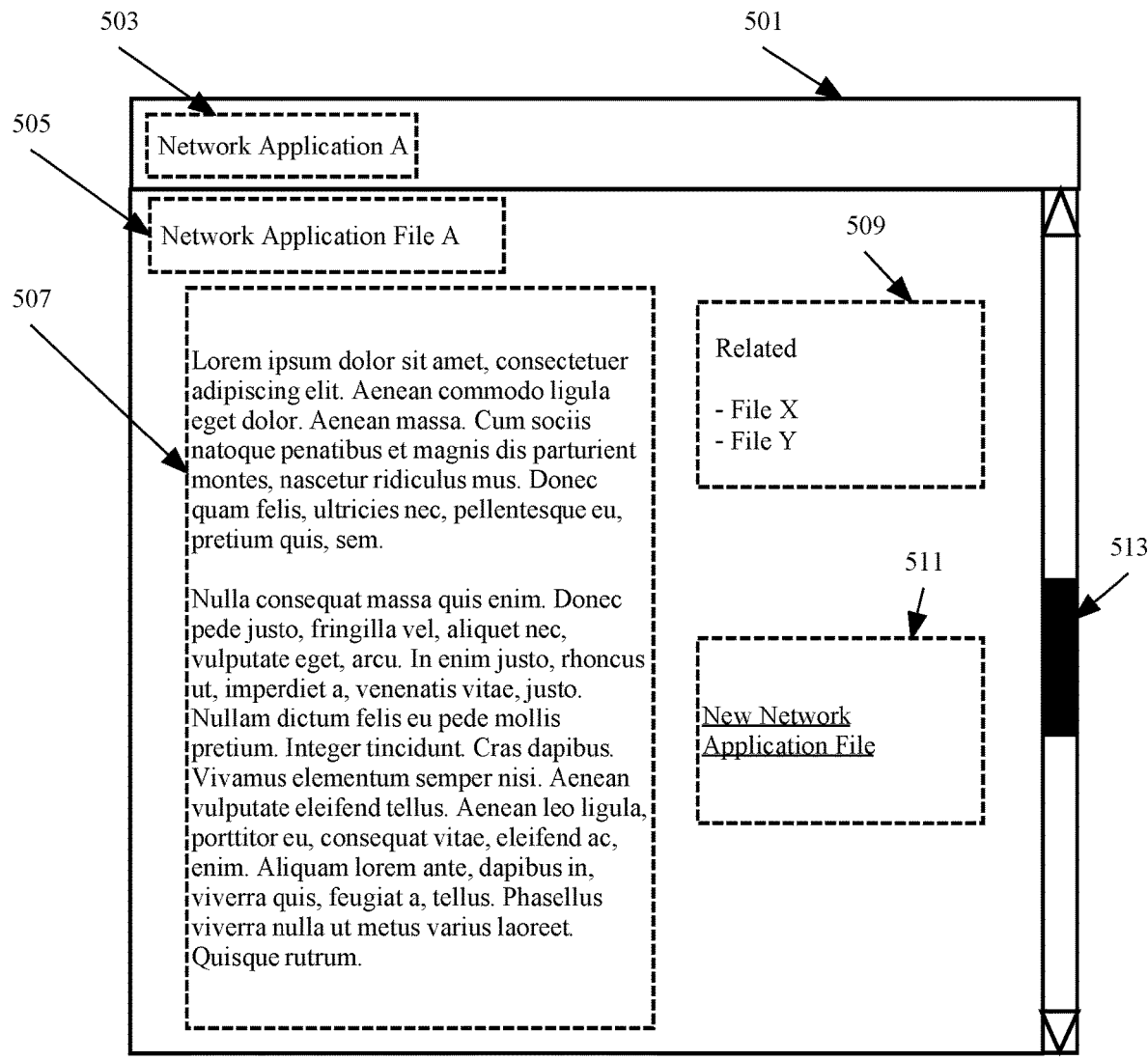
Figure 5B:
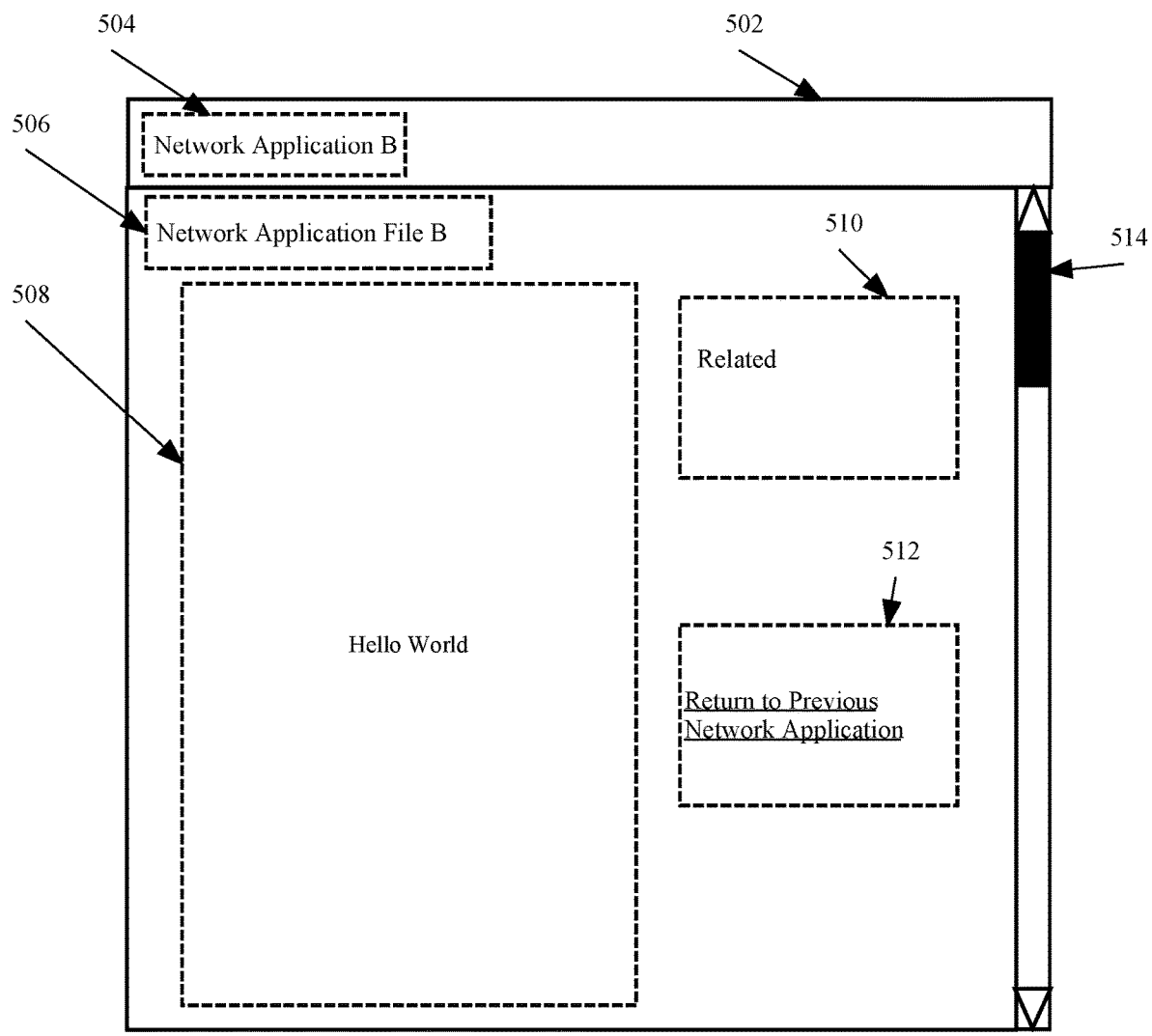
Figure 5C:
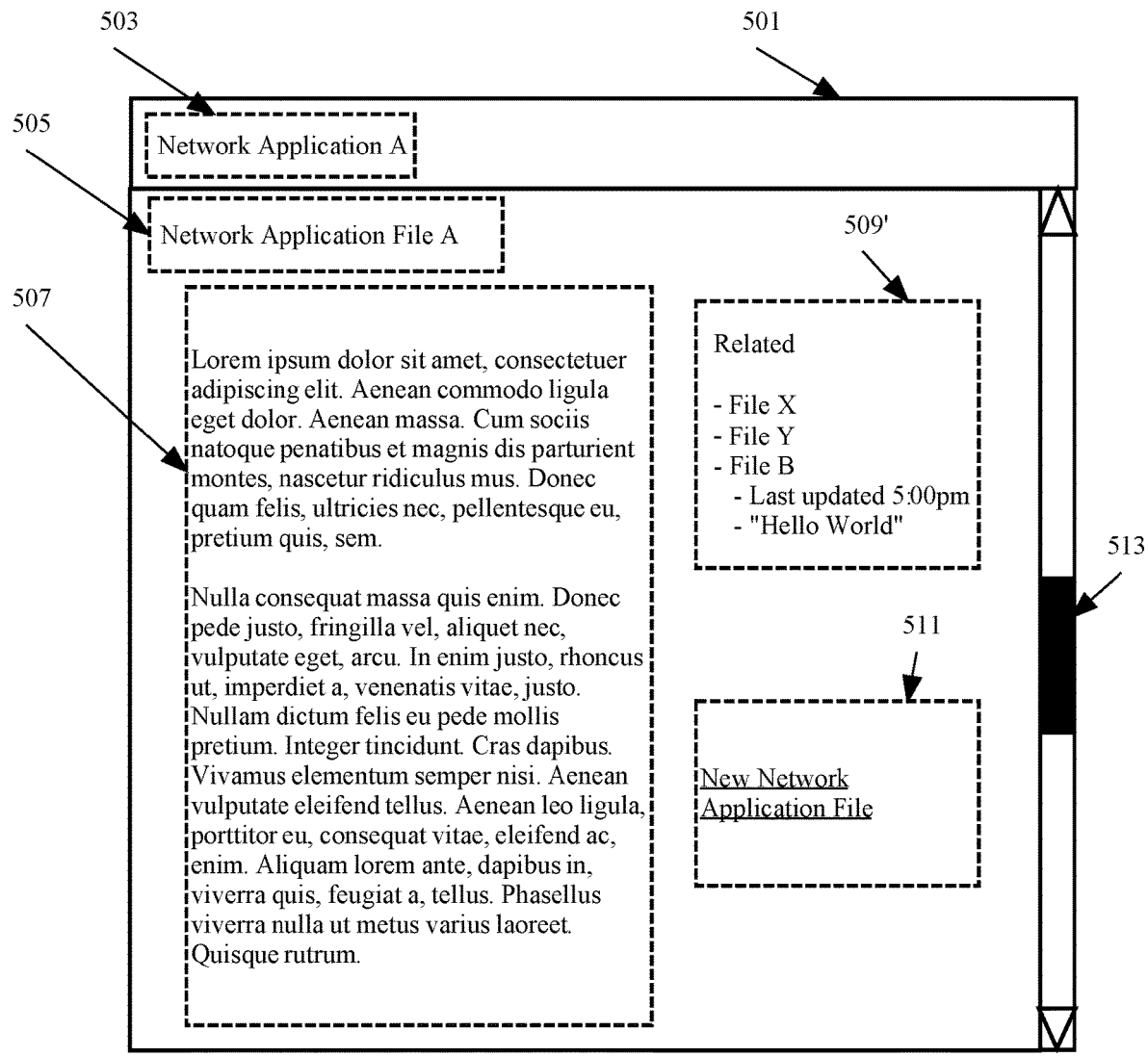

Having thus described some embodiments in general terms, reference will now be made to the accompanying drawings, which are not necessarily drawn to scale, and wherein:

FIG. 1 is an exemplary system architecture diagram of an enterprise platform system structured in accordance with some embodiments of the present invention;

FIG. 2 is an exemplary schematic diagram structured according to some embodiments of the present invention;

FIG. 3A illustrates an exemplary data flow structured according to some embodiments of the present invention;

FIG. 3B illustrates an exemplary process flow chart structured according to some embodiments of the present invention;

FIG. 3C illustrates another exemplary process flow chart structured according to some embodiments of the present invention;

FIG. 4 illustrates a flow chart of an exemplary method that is structured in accordance with some embodiments of the present invention;

FIG. 5A illustrates an exemplary first network application interface configured in accordance with some embodiments of the present invention;

FIG. 5B illustrates an exemplary second network application interface configured in accordance with some embodiments of the invention; and FIG. 5C illustrates an exemplary updated first network application interface in accordance with some embodiments of the invention.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the invention relate generally to an enterprise platform that supports multiple network applications that are accessible to a user operating a client device. The client device is configured to render and display network application interfaces that correspond to each supported network application. Enterprise platform systems structured in accordance with various embodiments of the invention are configured to support generating and updating network application interfaces in a manner that allows the user to seamlessly navigate between such network application interfaces without losing work or losing recent changes that were made within the network application.

For example, an enterprise platform configured in accordance with various embodiments of the invention may prompt a user who is accessing a first network application, e.g., Jira® by Atlassian, to take some action in a second network application, e.g., create a code branch in Bitbucket® by Atlassian. The enterprise platform is configured to generate various network application interfaces that allow the user to navigate from Jira to Bitbucket to create the code branch and then return to Jira. Importantly, when the user returns to Jira, the enterprise platform is configured to update the Jira network application interface to consider any changes (i.e., the creation of the new code branch) that were made in Bitbucket.

In contrast, other systems or platforms that do not incorporate the inventive embodiments discussed herein ("deficient system") may be plagued by limitations and inefficiencies. If we follow the Jira-Bitbucket-Jira example described above, such deficient systems are configured to allow the user to navigate from Jira to Bitbucket to create the code branch in Bitbucket; however, when the user returned to Jira, the Jira network application interface would not be updated to consider the change (i.e., the code creation) made in Bitbucket. This might cause the user to perceive that the Bitbucket change was not stored by the system, which could cause them to navigate to Bitbucket and recreate or reproduce the change.

The inventors have identified that the system resources to the re-navigation of the network application interface can be easily exhausted, and the failure to keep data up-to-date may comprise the data integrity of the system. The inventors have determined that the ability to generate an updated network application interface would reduce the system resource and time allocated after returning to a network application, and would keep the data in the network application up-to-date without multiple redundant iterations.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearable devices, personal computers, enterprise computers, and the like.

The term "user input" refers to data that is provided to a client device by a user, either directly or indirectly, via one or more input devices. The input device may be a number pad, a keyboard, a cursor control device (such as a mouse), a joystick, touch screen display, remote control, or any other device operative to interact with the client device.

The term "network application" refers to a computer program designed to perform a group of coordinated functions, tasks, or activities for a user, group of users, or for one or more other network applications. Examples of a network application may include an enterprise knowledge management and collaboration software (e.g., Confluence® by Atlassian), an enterprise software project planning and tracking application (e.g., Jira® by Atlassian, StatusPage® by Atlassian), a computer coding project collaboration engine (e.g., Bitbucket® by Atlassian, SourceTree® by Atlassian, Bamboo® by Atlassian, Clover® by Atlassian, FishEye® by Atlassian, Crucible® by Atlassian), an electronic networked messaging application (e.g., HipChat® by Atlassian), a scheduling engine, a word processor, a spreadsheet, or an accounting application. A network application may also refer to a collection of network applications. Network applications may also be built for mobile platforms.

The term "network application protocol" refers to a protocol that allows two or more software programs to communication with each other. A network application protocol may include a specification that describes how information is exchanged between software, preferably done in the form of a request for processing and a return of necessary data. A network application protocol may take the form of an Application Programming Interface (API), which includes a software interface written based on the specification to allow a software developer programming software that are capable of exchanging information.

The term "enterprise platform" or enterprise platform system refers to a computing service that is accessible via one or more computing devices and that is operable to provide access to a plurality of network applications related to business operations of an enterprise or company. In some examples, the enterprise platform may take the form of a central server disposed in communication with one or more additional servers running network applications, and having access to one or more databases storing application related data and/or the like.

The term "network application interface" refers to an interface (e.g., a graphic user interface of GUI) associated with a network application, which allows a user to communicate with a client device and use one or more network applications and/or other network components connected to these network applications. For example, a network application interface may be embodied by graphic or visual elements (e.g., dialog boxes, menus, icons, scroll bars) that are displayed via touchscreen display of a client device, and which allow a user to send a request (e.g., one or more user inputs) to a network application via one or more input devices (e.g., the touchscreen display, a mouse, a keyboard) of the client device.

The term "network application file" refers to a collection of data and/or computer readable instructions that are accessible by one or more network applications. Each network application file may have one or more "fields" that may be manipulated or edited based on user inputs. Each field is part of a network application file, and contains a single piece of data for the subject of the network application file. For example, Jira® by Atlassian uses the term "issue" to represent a software bug, a project task, a helpdesk ticket, or the like. In this example, various network application files may be associated with a selected issue by the network application.

The term "network application address" refers to a unique location of the network application. The network application address may be used to identify and distinguish between different network applications. It may be in the form of a Universal Resource Locator (URL), a full Internet Protocol (IP) address, a wildcard IP range, a host name, or the like.

The term "session" refers to an interactive information interchange between a user device (i.e., as represented by a unique IP address) and a network application. A session, also known as a "dialogue," begins when the connection between the client device and the network application starts, and is terminated when the connection is ended.

The term "network application session identifier" refers to a data structure that identifies network application session data associated with a network application session. For example, a network application session identifier may be generated based on an address of the session data of the network application stored in a network database, and optionally identifies a network application file of this network application or another network application.

The term "network application session data" refers to data and/or computer readable instructions that are related to a session associated with a network application. Network application session data may be stored in a network database. In some embodiments, network application session data may include a network application address (which identifies a network application) and one or more network session descriptors (which describe one or more attributes associated with a session of the network application). In some embodiments, network application session data may only include one or more network session descriptors. The term "network application session descriptors" refers to a collection of attributes, or tags, that describe a session of a network application. For example, if a network application interface contains multiple tabs, the network application session descriptors may include data related to which tabs have been opened during the session. The network application session descriptors may also include data related to the identification of the user in the session, as well as time duration for the session.

The term "network database" refers to a collection of data in a computer network that is organized so that its content can easily be accessed, managed, and updated. Network databases may be classified according to its dataset type, such as bibliographic, full text, numeric, and images. Network database may also be classified based on its organizational structure, such as relational database, distributed database, cloud database, Not Only SQL (NoSQL) database, object-oriented database, and graph database.

The term "network application file generation request" refers to data and/or computer readable instructions delivered to the host of the network application to perform the operation of generating a network application file. For example, a network application file generation request may be sent from a client device associated with an interface for network application A, and may include session data for network application A and address for network application B, where the network application file is to be generated by network application B.

The term "network application return request" refers to data and/or computer readable instructions from the client device requesting a return to a previous network application from a current network application. To facilitate the return, the network application return request may include session data of the current network application, and the network application session identifier of the previous network application.

Example System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system within which embodiments of the present invention may operate. Users may access an enterprise platform 117 via a communication network 103 (e.g., the Internet, Wi-Fi, LAN, WAN, or the like) using client devices 101A-101N. The enterprise platform 117 may comprise a server or servers (not shown) in communication with one or more network applications 111A-111N and one or more network databases 113A-113N. The server or servers may comprise an interface engine 109, a session data converter 105, and a network application controller 107.

The server or servers may be embodied as a computer or computers as known in the art and may provide for receiving of electronic data from various sources, including but not limited to the client devices 101A-101N. For example, the server or servers may be operable to receive and process network application file generation requests and network application return requests provided by the client devices 101A-101N. The server or servers may also facilitate the generation and providing of various network application interfaces.

The client devices 101A-101N may be any computing device as defined above. Electronic data received by the server or servers from the client devices 101A-101N may be provided in various forms and via various methods.

In some preferred and non-limiting embodiments, one or more of the client devices 101A-101N is a mobile device, such as a smart phone or tablet. The one or more client devices may execute an "app" to interact with the enterprise platform 117 via one or more servers. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via Application Programming Interfaces (APIs) provided by the mobile device operating system.

In some embodiments, the client device 101A-101N may interact with a server or servers of the enterprise platform 117 via a web browser. The client device 101A-101N may also include various hardware or firmware designed to interact with a server or servers of the enterprise platform 117.

The network databases 113A-113N may be embodied as a data storage device such as a network attached storage (NAS) device or devices, or as a separate database server or servers. The network databases 113A-113N include information accessed and stored by the network applications 111A-111N. For example, the network databases 113A-113N may include, without limitation, user account credentials for network application users, user profiles, session data associated with the network applications and/or the like.

An example of a data flow for exchanging electronic information among one or more client devices 101A-101N and the enterprise platform 117 is described below.

In the depicted embodiment, a server or servers of the enterprise platform 117 may utilize the interface engine 109 to generate a first network application interface. The first network application interface can be associated with one of the network applications 111A-111N (e.g., network application A 111A) based on data transmitted to the interface engine 109 from the network application controller 107. A server or servers of the enterprise platform 117 may transmit the first network application interface to one or more client devices 101A-101N via the communication network 103.

The one or more client devices 101A-101N are configured to generate a network application file generation request associated with the first network application interface. The network application file generation request describes one or more commands from the one or more client devices 101A-101N to the enterprise platform 117 to generate a file associated with a second network application (e.g. network application B 111B). The network application file generation request may include a first network application session identifier, which identifies network session data associated with the first network application and stored in one of the network databases 113A-113N (e.g. network database A 113A).

The network application file generation request may be transmitted to the enterprise platform 117 via the communication network 103. The enterprise platform 117 may provide the network application file generation request to a server or servers and may utilize the network application controller 107 to identify one of the network applications 111A-111N (e.g., network application B 111B) based on the network application file generation request. A server or servers of the enterprise platform 117 may then utilize the interface engine 109, in association with the network application protocol of the identified network application (e.g., network application B 111B), to generate a second network application interface, and transmit the second network application interface to the one or more client devices 101A-101N via the communication network 103.

The one or more client devices 101A-101N may transmit user inputs associated with the second network application interface to the enterprise platform 117 via the communication network 103. Based at least in part on the user inputs, the enterprise platform 117 may generate a second network application file associated with the identified network application (e.g., network application B 111B) and stored the second network application file to the corresponding database (e.g., network database B 113B).

The one or more client devices 101A-101N may also be configured to generate a network application return request associated with the second network application interface. The network application return request describes one or more commands from the one or more client devices 101A-101N to return to the first network application interface. The network application return request may include the first network application session identifier and the second network application session identifier. The second network application session identifier may identify network session data associated with the second network application and stored in one of the network databases 113A-113N (e.g. network database B 113B).

The network application return request may be transmitted to the enterprise platform 117 via the communication network 103. The enterprise platform 117 may provide the network application return request to a server or servers of the enterprise platform 117. Upon receiving the network application return request, the server or servers may retrieve the first network application session data from one of the network application databases 113A-113N based on the first network application session identifier.

A server or servers of the enterprise platform 117 may then utilize the session data converter 105 to convert the first network application session data, and transmit the converted data to the interface engine 109. Based on the converted data and the network application protocol associated with the first network application, the interface engine 109 may be configured to generate an updated first network application interface, and transmit the updated first network application interface to the one of the client devices 101A-101N.

In some embodiments, the network application session identifier may identify one or more network application files associated with the network application. The session data converter 105 may convey the network application session identifier to the network application controller 107, which in turn locates the network application file from the corresponding database (e.g. network database A 113A). In this regards, the network application may link the first network application file with the second network application file. In the event that the network application controller 107 is unable to locate the first network application file, it may convey data to interface engine 109 to generate a notification indicating that the first network application file is unavailable.

Example Apparatus for Implementing Embodiments of the Present Invention

A server or servers of the enterprise platform 117 may be embodied by one or more computing systems, such as apparatus 200 shown in FIG. 2. The apparatus 200 may include processor 202, memory 204, input/output circuitry 206, communications circuitry 208, interface generation circuitry 210, session data circuitry 212, and network application circuitry 214. The apparatus 200 may be configured to execute the operations described above with respect to FIG. 1 and below with respect to FIGS. 3A-4. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory 204 may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication circuitry 208 may include the circuitry for interacting with the antenna(s) to cause transmission of signals via the antenna(s) or to handle receipt of signals received via the antenna(s).

Interface generation circuitry 210 includes hardware and software configured to generate network application interface based on a network application file generation request or a network application return request. The interface generation circuitry 210 may utilize processing circuitry, such as the processor 202, to perform these actions. The interface generation circuitry 210 may receive data from the session data circuitry 212 and the network application circuitry 214, and send data to the communications circuitry 208. In some embodiments, the received data may be related to a network application and/or a network application session.

In some embodiments, the interface generation circuitry 210 may include a separate processor, specially configured field programmable gate array (FPGA), or application specific interface circuit (ASIC). In some implementations, the session data circuitry 212 and the network application circuitry 214, described below, may be sub-circuitries belonging to interface generation circuitry 210. The interface generation circuitry 210 may be implemented using hardware components of the apparatus configured by either hardware or software for implementing the functions described herein.

The session data circuitry 212 includes hardware and software configured to manage session data associated with one or more network applications. The session data circuitry may utilize processing circuitry, such as the processor 202, to perform these actions. However, it should also be appreciated that, in some embodiments, the session data circuitry 212 may include a separate processor, specially configured field programmable gate array (FPGA), or application specific interface circuit (ASIC) for performing the functions described herein. The session data circuitry 212 may be implemented using hardware components of the apparatus configured by either hardware or software for implementing these planned functions.

The network application circuitry 214 includes hardware and software configured to manage one or more network applications. The network application circuitry 214 may utilize processing circuitry, such as the processor 202, to perform these actions. However, it should also be appreciated that, in some embodiments, the network application circuitry 214 may include a separate processor, specially configured field programmable gate array (FPGA), or application specific interface circuit (ASIC) for performing the functions described herein. The network application circuitry 214 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flow for Generating Network Application Interfaces

FIG. 3A illustrates a data flow 300A for generating an updated network application interface in accordance with some embodiments of the present invention.

At block 301, the first network database receives first network application session data from the first network application API. The first network application session data may include, for example, data related to the location of a first network application interface that a user is currently viewing. At block 303, the first network application API receives the first network application session identifier, which identifies the first network application session data stored in the first network database.

At block 305, the first network application API receives a network application file generation request from a client device. In response to receiving the network application file generation request, the first network application API transmits the first network application session identifier to the second network application API at block 307.

At block 309, the second network application database receives second network application session data from the second network application API. The second network application session data may include, for example, data related to the location of the second network application interface that a user is currently viewing. In response to receiving the second network application session data, the second network database transmits a second network application session identifier, which identified the second network application session data stored in the second network database, to the second network application API at block 311.

At block 313, the second network application API receives a network application request. Upon receiving the network application return request, the second network application API returns the first network application session identifier at block 315 and the second network application session identifier at block 317 to the first network application API.

FIG. 3B illustrates an exemplary process flow chart 300B for generating an updated network application interface in accordance with some embodiments of the present invention.

A server or servers of the enterprise platform 117 may receive a network application file generation request 318 from one or more client devices 101A-101N via the communication network 103. The network application file generation request 318 may include a first network application session identifier. Upon receiving the network application file generation request 318, the second network application protocol 319 may generate a second network application interface 321, and transmit the second network application interface 321 to one or more client devices 101A-101N. Based on user inputs 323 associated with the second network application interface 321 a server or servers of the enterprise platform 117 may generate a second network application file 325.

The one or more client devices 101A-101N may then transmit a network application return request 327 to a server or servers of the enterprise platform 117. The network application return request 327 may include a first network application session identifier and a second network application session identifier. Based on the first network application session identifier, the first network application protocol 329 may generate an updated first network application interface 331.

FIG. 3C illustrates an exemplary process flow 300C for generating an updated network application interface in accordance with some other embodiments of the present invention.

A server or servers of the enterprise platform 117 may receive a network application file generation request 333 from one or more client devices 101A-101N via the communication network 103. The network application file generation request 333 includes a second network application address 335 and first network application session data 337. A server or servers of the enterprise platform 117 then generates a second network application interface 339, and transmits the second network application interface 339 to one or more client devices 101A-101N. Based on user inputs 341 associated with the second network application interface 339, a server or servers of the enterprise platform 117 generates a network application file 343.

The one or more client devices 101A-101N may then transmit a network application return request 345 to a server or servers of the enterprise platform 117. The network application return request 345 may include a first network application session identifier 347 and a second network application session data 349. The first network application session identifier 347 may be generated based on the first network application session data 337 and the second network application file 343. Based on the first network application session identifier 347, a server or servers of the enterprise platform 117 may generate an updated first network application interface 351, and transmits the updated first network application interface 351 to the one or more client devices 101A-101N.

FIG. 4 illustrates a flow diagram depicting an example of a process 400 for generating an updated first network application interface in accordance with some embodiments of the present invention. The process 400 may be performed by an apparatus, such as the apparatus 200 described above with respect to FIG. 2.

The process 400 starts at block 402. At block 404, an apparatus, such as apparatus 200, may be configured to generate a second network application file. At block 406, the apparatus may receive an application return request, which includes second network application session data and a first network application session identifier. At block 408, the apparatus may be configured to locate the first network application based on the first network application session identifier.

At block 410, the apparatus may be configured to determine whether a first network application file exist based on the first network application session identifier. In the event that the first network application file has been deleted or otherwise become unavailable, the apparatus generates a notification at block 416, indicating that the first network application file is unavailable. In the event that the first network application file is still available, the apparatus may be configured to locate the first network application file at block 412, and link the first network application file with the second network application file at block 414.

At block 418, the apparatus may be configured to generate an updated application interface. The updated application interface may include any details about the linked files. The surfaced details may include any type or amount of details including, but not limited to: file content, modification time, current user(s), status, file type, etc. The process 400 ends at block 420.

Example Network Application Interfaces

FIGS. 5A-5C illustrate example network application interfaces according to some embodiments of the present invention.

In FIG. 5A, the network application interface 500A may be displayed through a browser 501. The browser 501 may have a network application title bar 503 and a network application file title bar 505. The network application title bar 503 indicates the name of the network application (e.g. Network Application A), and the network application file title bar 505 indicates the name of the network application file (e.g. Network Application File A). In other embodiments, network application interfaces need not be browser based and may instead be supported by one or more mobile applications or mobile apps.

Impression 507 is a representation of the network application file. The browser 501 may have a scroll bar 513, indicating a location of the impression 507 where the user has navigated or is navigating.

The related section 509 indicates other network application files related to the network application file that is represented by impression 507. A user may submit a network application file generation request through the network application file generation link 511. Once the request is submitted and received by a server or servers of the enterprise platform 117 a network application interface is generated, such as the network application interface depicted in FIG. 5B.

FIG. 5B illustrates an exemplary network application interface 500B, generated by a server or servers of the enterprise platform 117 after the user submits a network application file generation request. The network application interface 500B may be displayed through a browser 502, which may have a network application title bar 504 and a network application file title bar 506. The network application title bar 504 indicates the name of the network application (e.g. Network Application B), and a network application file title bar 506 indicates the name of the network application file that has been generated (e.g. Network Application File B). Impression 508 is a representation of the network application file that has been generated. The browser 502 may have a scroll bar 514, indicating a location of the impression 508 where the user has navigated or is navigating. The related section 510 indicates other network application files related to the network application file that is represented by impression 508. A user may submit a network application return request through the network application return request link 512. Once the request is submitted and received by a server or servers of the enterprise platform 117, an updated network application interface may be generated, such as the network application interface depicted in FIG. 5C.

FIG. 5C illustrates an exemplary updated network application interface 500C, generated by a server or servers of the enterprise platform 117 after the user submits a network application return request. The updated network application interface 500C indicates the same location of the impression 507 as that of the network application interface 500A, which is evidenced by the same position of the scroll bar 513. In other words, the updated network application interface 500C allows a user to resume from the point where the user previously stopped in the network application interface 500A. Thus, the user does not have to re-navigate the network application interface 500C.

In addition, the related section 509' is updated to indicate the connection between the network application file represented by impression 507 and the network application file represented by impression 508. Additionally, 509' is updated to surface additional details about File B from FIG. 5B, so that users may have additional insight into the related files. Any type of details may be surfaced, and the surfaced details may be displayed in any manner. The example in FIG. 5C shows a last modified time, and the content of the file.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method, the method comprising:

outputting, to a client device, a first network application interface associated with a first network application having a first network application protocol;

receiving, from the client device, a network application file generation request associated with the first network application interface, the network application file generation request comprising a first network application session identifier identifying a session between the client device and the first network application;

in response to receiving the network application file generation request, outputting, to the client device, a second network application interface associated with a second network application having a second network application protocol, based on the network application file generation request and the second network application protocol;

receiving, from the client device, a user input associated with the second network application interface;

in response to receiving the user input associated with the second network application interface, generating a second network application file comprising second network application data based on the user input;

receiving, from the client device, a network application return request associated with the second network application interface; and in response to receiving the network application return request:

updating the first network application that is identified using the first network application session identifier with the second network application data stored in the second network application file, the second network application data identified using a second network application session identifier, wherein the first network application session identifier and the second network application session identifier are included in the network application return request, and wherein the second network application session identifier further identifies a session between the client device and the second network application; and outputting, to the client device, an updated first network application interface associated with the first network application based on the updated first network application and the first network application protocol.

2. The computer-implemented method of claim 1, wherein the first network application session identifier further indicates first network application session data stored in a network database.

3. The computer-implemented method of claim 2, wherein the first network application session data includes at least one of: a first user attribute, a first time attribute, and a first status attribute, and wherein the second network application session data includes at least one of: a second user attribute, a second time attribute, and a second status attribute.

4. The computer-implemented method of claim 2, wherein the outputting, to the client device, the updated first network application interface further comprises:

retrieving, based on the first network application session identifier, the first network application session data; and generating, based on the first network application session data and the first network application protocol, the updated first network application interface.

5. The computer-implemented method of claim 1, further comprising:

determining, based on the first network application session identifier, whether a first network application file is available;
based on the determining that the first network application file is unavailable, outputting, to the client device, an unavailability notification; and
based on the determining that the first network application file is available, linking the second network application file with the first network application file.

6. The computer-implemented method of claim 1, wherein the first network application protocol is a first Application Program Interface (API), and the second network application protocol is a second API.

7. An apparatus comprising:
at least one processor; and
at least one non-transitory memory including computer program code,
wherein the computer program code is configured to, when executed by the at least one processor, to cause the apparatus to:
output, to a client device, a first network application interface associated with a first network application having a first network application protocol;
receive, from the client device, a network application file generation request associated with the first network application interface, the network application file generation request comprising a first network application session identifier identifying a session between the client device and the first network application;
in response to the network application file generation request received from the client device, output, to the client device, a second network application interface associated with a second network application having a second network application protocol, based on the network application file generation request and the second network application protocol;
receive, from the client device, a user input associated with the second network application interface;
in response to the user input received from the client device, generate a second network application file comprising second network application data based on the user input;
receive, from the client device, a network application return request associated with the second network application interface; and
in response to receiving the network application return request:
update the first network application that is identified using the first network application session identifier with the second network application data stored in the second network application file, the second network application data identified using a second network application session identifier, wherein the first network application session identifier and the second network application session identifier are included in the network application return request, and wherein the second network application session identifier further identifies a session between the client device and the second network application; and
output, to the client device, an updated first network application interface associated with the first network application based on the updated first network application and the first network application protocol.

8. The apparatus of claim 7, wherein the first network application session identifier further indicates first network application session data stored in a network database.

9. The apparatus of claim 8, wherein the first network application session data includes at least one of: a first user attribute, a first time attribute, and a first status attribute, and wherein the second network application session data includes at least one of: a second user attribute, a second time attribute, and a second status attribute.

10. The apparatus of claim 8, wherein to output, to the client device, the updated first network application interface, the computer program code is further configured to, when executed by the at least on processor, to cause the apparatus to:
retrieve, based on the first network application session identifier, the first network application session data; and
generate, based on the first network application session data and the first network application protocol, the updated first network application interface.

11. The apparatus of claim 7, wherein the computer program code is further configured to, when executed by the at least one processor, to cause the apparatus to:
determine, based on the first network application session identifier, whether a first network application file is available;
upon determining that the first network application file is unavailable, output, to the client device, an unavailability notification; and
upon determining that the first network application file is available, link the second network application file with the first network application file.

12. The apparatus of claim 7, wherein the first network application protocol is a first Application Program Interface (API), and the second network application protocol is a second API.

13. A computer program product comprising computer-readable program code portions stored on at least one non-transitory computer readable storage media, the computer-readable program code portions comprising an executable portion configured to:
output, to a client device, a first network application interface associated with a first network application having a first network application protocol;
receive, from the client device, a network application file generation request associated with the first network application interface, the network application file generation request comprising a first network application session identifier identifying a session between the client device and the first network application;
in response to the network application file generation request received from the client device, output, to the client device, a second network application interface associated with a second network application having a second network application protocol, based on the network application file generation request and the second network application protocol;
receive, from the client device, a user input associated with the second network application interface;
in response to the user input received from the client device, generate a second network application file comprising second network application data based on the user input;
receive, from the client device, a network application return request associated with the second network application interface; and
in response to receiving the network application return request:
update the first network application that is identified using the first network application session identifier with the second network application data stored in the second network application file, the second network application data identified using a second network application session identifier, wherein the first network application session identifier and the second network application session identifier are included in the network application return request, and wherein the second network application session identifier further identifies a session between the client device and the second network application; and output, to the client device, an updated first network application interface associated with the first network application based on the updated first network application and the first network application protocol.

14. The computer program product of claim 13, wherein the first network application session identifier further indicates first network application session data stored in a network database.

15. The computer program product of claim 14, wherein the first network application session data includes at least one of: a first user attribute, a first time attribute, and a first status attribute, and wherein the second network application session data includes at least one of: a second user attribute, a second time attribute, and a second status attribute.

16. The computer program product of claim 14, wherein to output, to the client device, the updated first network application interface, the executable portion is further configured to:

retrieve, based on the first network application session identifier, the first network application session data; and generate, based on the first network application session data and the first network application protocol, the updated first network application interface.

17. The computer program product of claim 13, wherein the executable portion is further configured to:

determine, based on the first network application session identifier, whether a first network application file is available;

based on the determining that the first network application file is unavailable, output, to the client device, an unavailability notification; and based on the determining that the first network application file is available, link the second network application file with the first network application file.

18. The computer program product of claim 13, wherein the first network application protocol is a first Application Program Interface (API), and the second network application protocol is a second API.

* * * * *